United States Patent [19]
Saito et al.

[11] Patent Number: 5,461,105
[45] Date of Patent: Oct. 24, 1995

[54] RESIN COMPOSITION HAVING EXCELLENT PAINT COATABILITY

[75] Inventors: Yoshiharu Saito; Masao Sakaizawa; Kunio Iwanami; Kitsusho Kitano; Michihisa Tasaka, all of Kawasaki; Kenji Kawazu, Aichi; Shizuo Miyazaki, Okazaki; Takao Nomura, Toyota; Takeyoshi Nishio, Okazaki; Hisayuki Iwai, Aichi, all of Japan

[73] Assignees: Tonen Chemical Corporation, Tokyo; Toyota Jidosha Kabushiki Kaisha, Toyota, both of Japan

[21] Appl. No.: 415,566

[22] Filed: Apr. 3, 1995

Related U.S. Application Data

[62] Division of Ser. No. 329,136, Oct. 25, 1994, which is a continuation of Ser. No. 42,653, Apr. 2, 1993, abandoned.

[30] Foreign Application Priority Data

Jun. 4, 1992 [JP] Japan ..................... 4-170149

[51] Int. Cl.⁶ ........................................... C08L 53/00
[52] U.S. Cl. ................................. 524/505; 525/88
[58] Field of Search ................................. 524/505; 525/88

[56] References Cited

U.S. PATENT DOCUMENTS

| | | | |
|---|---|---|---|
| 4,480,065 | 10/1984 | Kawai et al. | 524/418 |
| 4,705,818 | 11/1987 | Kawai et al. | 523/200 |
| 4,748,206 | 5/1988 | Nogiwa et al. | 525/88 |
| 4,764,404 | 8/1988 | Genske et al. | 428/35.3 |
| 4,960,823 | 10/1990 | Komatsu et al. | 525/89 |
| 5,045,589 | 9/1991 | Ueno | 524/505 |

FOREIGN PATENT DOCUMENTS

| | | |
|---|---|---|
| 0132968 | 7/1984 | European Pat. Off. |
| 1204946 | 8/1989 | Japan |
| 4-153243 | 5/1992 | Japan |
| 2097408 | 3/1982 | United Kingdom |
| 0265075 | 9/1987 | United Kingdom |
| 2206886 | 6/1988 | United Kingdom |
| 2246358 | 9/1991 | United Kingdom |
| WO90/01519 | 2/1990 | WIPO |

OTHER PUBLICATIONS

Brochure of TAFMER A/P (Ethylene/Alpha–Olefin Copolymer).

*Primary Examiner*—Paul R. Michl
*Assistant Examiner*—Mark L. Warzel
*Attorney, Agent, or Firm*—Sughrue, Mion, Zinn, Macpeak & Seas

[57] ABSTRACT

A resin composition having excellent paint coatability containing (a) 50–80 weight % of a multi-stage polymerized propylene-ethylene block copolymer consisting essentially of (i) a propylene homopolymer portion, (ii) a propylene-ethylene random copolymer portion, and (iii) an ethylene homopolymer portion, (b) 20–40 weight % of an ethylene-α-olefin copolymer elastomer, and (c) 20 weight % or less of an inorganic filler, components in the components (a) and (b), which are soluble in p-xylene at a room temperature, having a number-average molecular weight of $4 \times 10^4$ or more and a weight-average molecular weight of $20 \times 10^4$ or more.

2 Claims, No Drawings ically, to a resin composition having excellent paint coatability and moldability, a good balance of impact resistance, ductility, mechanical strength, thermal deformation resistance, brittle temperature, hardness, etc., small molding shrinkage and linear expansion coefficient, and a high paint coating peeling resistance in high-temperature, high-pressure washing.

RESIN COMPOSITION HAVING EXCELLENT PAINT COATABILITY

This is a divisional of parent application Ser. No. 08/329,136, filed Oct. 25, 1994, which is a continuation of grandparent application Ser. No. 08/042,653, filed April 2, 1993, now abandoned. Priority is claimed from Jul. 4, 1992 based on Japanese Patent Application No. 4-170149. The priority document was filed in grandparent Application No. 08/042,653.

BACKGROUND OF THE INVENTION

The present invention relates to a resin composition for exterior automotive parts, and more particularly to a resin composition having excellent paint coatability and moldability, a good balance of impact resistance, ductility, mechanical strength, thermal deformation resistance, brittle temperature, hardness, etc., small molding shrinkage and linear expansion coefficient, and a high paint coating peeling resistance in high-temperature, high-pressure washing.

Since polypropylene is light and has excellent mechanical strength, it is used in various applications. However, since it is poor in impact resistance, its copolymers such as propylene-ethylene block copolymers are used. Also, proposals have been made to provide a resin composition comprising a propylene-ethylene block copolymer, an ethylene-α-olefin copolymer elastomer and an inorganic filler such as talc.

Japanese Patent Laid-Open No. 61-12742 discloses a resin composition comprising (a) 62–57 weight % of a propylene-ethylene block copolymer having an ethylene content of 2–3 weight % and a melt flow rate of 40–45 g/10 minutes, (b) 26–28 weight % of an ethylene-propylene copolymer elastomer having an ethylene content of 70–80 weight % and a Mooney viscosity $ML_{1-4}$ (100° C.) of 55–58, (c) 2–3 weight % of a high-density polyethylene having a density of 0.955–0.960 g/cm$^3$ and a melt flow rate of 18–22 g/10 minutes, and (d) 10–12 weight % of talc having an average size of 1.8–2.2 μm and a specific surface area of 36000–42000 cm$^2$/g, the resin composition having a melt flow rate of 13–18 g/10 minutes, a density of 0.950–0.980 g/cm$^3$, a flexural modulus of 11500–14000 kg/cm$^2$, a linear expansion coefficient of $7\times10^{-5}$–$10\times10^{-5}$ cm/cm/°C. in a temperature range between 20° C. and 80° C., and a surface gloss (measured by a 60°–60° method according to JIS Z8741) of 55% or more.

Japanese Patent Laid-Open No. 1-149845 discloses a resin composition comprising (a) 59–74 weight % of a propylene-ethylene block copolymer containing 5–12 weight % of a boiling p-xylene-soluble component having an ethylene content of 20–60 weight %, and having an ethylene content of 1–7 weight % and a melt flow rate of 15–50 g/10 minutes, (b) 35–20 weight % of an ethylene-propylene copolymer elastomer having a propylene content of 20–60 weight % and a Mooney viscosity $ML_{1+4}$ (100° C.) of 100–150, and (c) 3–6 weight % of talc having a specific surface area of 30000 cm$^2$/g or more and an average size of 0.5–2.0 μm.

However, both resin compositions of Japanese Patent Laid-Open Nos. 61-12742 and 1-149845 are susceptible to thermal deformation, and bumpers made of such resin compositions would be easily deformed due to the difference in a linear expansion coefficient between the resin compositions and the automotive body parts in a high-temperature environment, resulting in the deterioration of automotive body appearance. Also, since beautiful coatings are recently formed on bumpers, etc., the resin compositions for bumpers, etc. should have good paint coatability in order to provide the automotive bodies with good appearance.

In the above-described resin compositions comprising the propylene-ethylene block copolymer, the ethylene-propylene copolymer elastomer (or high-density polyethylene) and talc, their flowability is controlled for various applications by adjusting ethylene/propylene ratios and molecular weights, etc. in the propylene-ethylene block copolymer and the ethylene-propylene copolymer elastomer. However, the control of such parameters fails to provide resin compositions having well balanced properties such as paint coatability, moldability, rigidity, ductility, thermal deformation resistance, brittle temperature, hardness, etc. on levels suitable for exterior automotive parts.

As a polypropylene resin composition for automotive bumpers having an improved paint coatability, Japanese Patent Laid-Open No. 57-55952 discloses a polypropylene resin composition comprising 55–65 weight % of a crystalline propylene-ethylene block copolymer containing 5–10 weight % of ethylene, a propylene component, 97 weight % or more of which is insoluble is boiling n-heptane, and a component soluble in p-xylene at a room temperature having an intrinsic viscosity (in decalin at 135° C.) of 3–4 and a melt flow rate of 2–10; 30–35 weight % of an amorphous ethylene-propylene copolymer elastomer having an intrinsic viscosity (in decalin at 135° C.) of 2.0–3.5 and a Mooney viscosity $ML_{1+4}$ (100° C.) of 40–100; and 5–15 weight % of talc having an average size of 0.5–5 μm. This resin composition shows an improved resistance to peeling of coatings formed thereon, but it fails to show a sufficient peeling resistance of the coatings in washing under severe conditions such as high temperature and/or high pressure.

OBJECT AND SUMMARY OF THE INVENTION

Accordingly, an object of the present invention is to provide a resin composition for exterior automotive parts having excellent paint coatability and moldability, and well balanced impact resistance, ductility, mechanical strength, thermal deformation resistance, brittle temperature and hardness while showing small molding shrinkage and linear expansion coefficient.

Another object of the present invention is to provide a resin composition for exterior automotive parts further having good peeling resistance of coatings under severe conditions such as high-temperature, high-pressure washing.

As a result of intense research in view of the above objects, the inventors have found that by blending a propylene-ethylene block copolymer produced by a multi-stage polymerization, an ethylene-α-olefin copolymer elastomer and an inorganic filler, and by controlling the content of propylene-ethylene random copolymer portion in the resulting resin composition and various parameters of the components, the resulting resin composition shows well balanced impact resistance, ductility, mechanical strength, thermal deformation resistance, brittle temperature and hardness.

With respect to the peeling resistance of a coating formed on a resin molding substrate under severe conditions such as high-temperature, high-pressure washing, the inventors have also found that the peeling resistance is usually determined by a Young's modulus of the coating, the strength of a substrate and an adhesion strength between the coating and the substrate, and that if the adhesion strength between the coating and the substrate is-large enough, the peeling resistance is not affected by the adhesion strength, but largely affected by the strength of the substrate itself. However, if it is tried to increase the strength of the resin substrate, the resin substrate is likely to show decreased impact resistance. In order to increase the strength of the resin substrate while preventing a decrease in the impact resistance, the inventors have found that it can effectively be achieved by increasing the strength of elastomer components in the resin composition, specifically a propylene-ethylene random copolymer portion in the propylene-ethylene block copolymer and an ethylene-α-olefin copolymer elastomer. The present invention has been completed based on these findings.

Thus, the first resin composition having excellent paint coatability comprising;
- (a) 50–80 weight % of a multi-stage polymerized propylene-ethylene block copolymer,
- (b) 20–40 weight % of an ethylene-α-olefin copolymer elastomer, and
- (c) 20 weight % or less of an inorganic filler, components in the components (a) and (b), which are soluble in p-xylene at a room temperature, having a number-average molecular weight of $4 \times 10^4$ or more and a weight-average molecular weight of $20 \times 10^4$ or more.

The second resin composition having excellent paint coatability comprising;
- (a) 50–80 weight % of a multi-stage polymerized propylene-ethylene block copolymer,
- (b) 20–40 weight % of an ethylene-α-olefin copolymer elastomer, and
- (c) 20 weight % or less of an inorganic filler, components in the components (a) and (b), which are soluble in p-xylene at a room temperature, having a crystallinity of 20–30%.

The third resin composition having excellent paint coatability comprising;
- (a) 50–80 weight % of a multi-stage polymerized propylene-ethylene block copolymer,
- (b) 20–40 weight % of an ethylene-αolefin copolymer elastomer, and
- (c) 20 weight % or less of an inorganic filler, components in the components (a) and (b), which are soluble in p-xylene at a room temperature, having a melting point of 50° C. or higher.

The fourth resin composition having excellent paint coatability comprising;
- (a) 50–80 weight % of a multi-stage polymerized propylene-ethylene block copolymer consisting essentially of (i) a propylene homopolymer portion, (ii) a propylene-ethylene random copolymer portion, and (iii) an ethylene homopolymer portion, the propylene-ethylene random copolymer portion having a number-average molecular weight of $20 \times 10^4$ or more and a weight-average molecular weight of $60 \times 10^4$ or more;
- (b) 20–40 weight % of an ethylene-α-olefin copolymer elastomer, and
- (c) 20 weight % or less of an inorganic filler.

The fifth resin composition having excellent paint coatability comprising;
- (a) 50–80 weight % of a multi-stage polymerized propylene-ethylene block copolymer consisting essentially of (i) a propylene homopolymer portion, (ii) a propylene-ethylene random copolymer portion, and (iii) an ethylene homopolymer portion, an ethylene content being 60 weight % or more and the ethylene homopolymer portion (iii) being 40 weight % or more based on the total amount (100 weight %) of the propylene-ethylene random copolymer portion (ii) and the ethylene homopolymer portion (iii);
- (b) 20–40 weight % of an ethylene-α-olefin copolymer elastomer, and
- (c) 20 weight % or less of an inorganic filler.

The sixth resin composition having excellent paint coatability comprising;
- (a) 50–80 weight % of a multi-stage polymerized propylene-ethylene block copolymer consisting essentially of (i) 80–95 weight % of a propylene homopolymer portion, (ii) 5–20 weight % of a propylene-ethylene random copolymer portion, and (iii) 10 weight % or less of an ethylene homopolymer portion, the propylene homopolymer portion (i) having an intrinsic viscosity of 0.9–1.2 dl/g, the propylene-ethylene random copolymer portion (ii) having an intrinsic viscosity of 4.0 dl/g or more, an ethylene content in the propylene-ethylene random copolymer portion (ii) being 30–70 weight %;
- (b1) 10–20 weight % of an ethylene-propylene copolymer elastomer;
- (b2) 10–20 weight % of an ethylene-butene copolymer elastomer; and
- (c) 20 weight % or less of an inorganic filler, the total of the (b1) and (b2) being 25–35 weight %, and a ratio (B/A) of an intrinsic viscosity (B) of the other component than the propylene homopolymer portion (i) in the resin composition to an intrinsic viscosity (A) of the propylene homopolymer portion (i) being within the range of 0.1–2.5.

DETAILED DESCRIPTION OF THE INVENTION

[A] Components of resin composition

[1] First resin composition

The first resin composition of the present invention comprises (a) a multi-stage polymerized propylene-ethylene block copolymer, (b) an ethylene-α-olefin copolymer elastomer, and (c) an inorganic filler.

(a) Multi-stage polymerized propylene-ethylene block copolymer

The propylene-ethylene block copolymer usable in the present invention are those produced by a so-called multi-stage polymerization method. In the multi-stage polymerization, propylene is first polymerized in the presence of a catalyst such as a Ziegler catalyst to form a crystalline propylene homopolymer portion which may contain a small proportion of a comonomer, and then ethylene+propylene are supplied to a reactor to form a propylene-ethylene random copolymer portion.

The propylene-ethylene block copolymer produced by the multi-stage polymerization consists essentially of (i) a crystalline propylene homopolymer portion, (ii) a propylene-ethylene random copolymer portion, and (iii) an ethylene homopoloymer portion. These polymer components may exist as separately or in an unseparably combined state. Though each portion of the propylene-ethylene block copolymer consists essentially of propylene and/or ethylene, other α-olefins and dienes, etc. may be contained in small amounts.

The propylene-ethylene random copolymer portion has a low crystallinity, and preferably contains 30–70 weight % of ethylene. If the ethylene content is lower than 30 weight %, or if it exceeds 70 weight %, the resulting resin composition would show undesirably poor ductility.

The weight-average molecular weight of the propylene-ethylene random copolymer portion (ii) is preferably $20 \times 10^4$ or more, more preferably $20 \times 10^4$–$80 \times 10^4$, most preferably $50 \times 10^4$–$80 \times 10^4$. Also, the number-average molecular weight of the propylene-ethylene random copolymer portion is preferably $4 \times 10^4$ or more, more preferably $4 \times 10^4$–$10 \times 10^4$, most preferably $7 \times 10^4$–$10 \times 10^4$.

The ethylene content in the entire propylene-ethylene block copolymer is preferably 2–10 weight %. Also, On the basis of the total amount (100 weight %) of the components (i)–(iii), the propylene homopolymer portion (i) is preferably 80–95 weight %, the propylene-ethylene random copolymer portion (ii) is preferably 5–20 weight %, and the ethylene homopolymer portion (iii) is preferably 10 weight % or less. Outside the above ranges, the resin composition would not show good properties.

The multi-stage polymerized propylene-ethylene block copolymer preferably shows a melt flow rate (MFR, 230° C., 2.16 kg lead) of 15–120 g/10 minutes. If the MFR is lower than 15 g/10 minutes, the resulting resin composition would have poor moldability, particularly injection-moldability. On the other hand, if the MFR is higher than 120 g/10 minutes, the resin composition would be likely to exhibit poor mechanical strength.

(b) Ethylene-α-olefin copolymer elastomer

The ethylene-α-olefin copolymer elastomer is a copolymer elastomer composed of ethylene and at least one other α-olefin. For instance, an ethylene-propylene copolymer elastomer (EPR), an ethylene-propylene-dieno copolymer elastomer (EPDM), an ethylene-butene copolymer elastomer (EBR), etc. are used as the ethylene-α-olefin copolymer elastomer.

Specifically, in the case of the ethylene-propylene copolymer elastomer (EPR) and the ethylene-propylene-diene copolymer elastomer (EPDM), the preferred ethylene content is 50–90 mol % and the preferred propylene content is 50–10 mol %. More preferably, the ethylene content is 70–80 mol % and the content is 30–20 mol %. In the case of the ethylene-propylene propylene-diene copolymer elastomer (EPDM), the preferred diene monomers are ethylidene norbornene, dicyclopentadiene, 1,4-hexadiene, etc. The diene content is preferably 1–10 mol %.

The ethylene-propylene copolymer elastomer (EPR) and the ethylene-propylene-diene copolymer elastomer (EPDM) may preferably have a melt flow rate (MFR, 230° C., 2.16 kg load) of 0.5–20 g/10 minutes, and more preferably 0.5–10 g/10 minutes.

The ethylene-butene copolymer elastomer (EBR) preferably has an ethylene content of 70–85 mol %, and a butene-1 content of 30–15 mol %. More preferably, the ethylene content is 75–85 mol % and the butene-1 content is 25–15 mol %. The ethylene-butene copolymer elastomer (EBR) preferably has a melt index (MI, 190° C., 2.16 kg load) of 1–30 g/10 minutes, and more preferably 1–20 g/10 minutes.

The ethylene-α-olefin copolymer elastomer preferably has a number-average molecular weight of $2 \times 10^4$–$8 \times 10^4$, more preferably $3 \times 10^4$–$6 \times 10^4$, and a weight-average molecular weight of $7 \times 10^4$–$20 \times 10^4$, more preferably $10 \times 10^4$–$20 \times 10^4$.

The above-described species of the ethylene-α-olefin copolymer elastomer may be used alone or in combination.

(c) Inorganic filler

The inorganic fillers are generally used as reinforcing fillers for resins, etc. The inorganic fillers are, for instance, talc, mica, fibrous crystalline calcium silicate, calcium carbonate, etc. Among them, talc is preferable.

The inorganic filler preferably has an average size of 15 μm or less. In the case of needle-shaped or fibrous inorganic filler, its diameter is preferably 1–100 μm, and its aspect ratio is preferably 3–30.

(d) P-xylene-soluble component

A component soluble in p-xylene at a room temperature in the components (a) and (b) is an elastomeric component consisting essentially of the propylene-ethylene random copolymer portion (ii) in the component (a), and the ethylene-α-olefin copolymer elastomer (b). This p-xylene-soluble component has a number-average molecular weight of $4 \times 10^4$ or more, preferably $4 \times 10^4$–$7 \times 10^4$, and a weight-average molecular weight of $20 \times 10^4$ or more, preferably $20 \times 10^4$–$30 \times 10^4$. If the p-xylene-soluble component has a number-average molecular weight lower than $4 \times 10^4$ or a weight-average molecular weight lower than $20 \times 10^4$, the resulting resin composition would have poor mechanical strength, resulting in insufficient improvement in peeling resistance of coatings formed thereon.

Incidentally, the above elastomeric component may be obtained by dissolving the resin composition in boiling p-xylene to separate out the inorganic filler, and cooling it to separate out the propylene homopolymer portion (i) and the ethylene homopolymer portion (iii) as insoluble components, leaving the elastomeric component (ii) in a solution in p-xylene.

(e) Proportions of components in first resin composition

The proportions of the above components (a)–(c) in the first resin composition are such that the propylene-ethylene block copolymer is 50–80 weight %, preferably 55–75 weight %, the ethylene-α-olefin copolymer elastomer is 20–40 weight %, preferably 20–30 weight %, and the inorganic filler is 20 weight or less, preferably 5–15 weight %.

If the amount of the propylene-ethylene block copolymer is less than 50 weight %, the resulting resin composition would fail to show improved elongation. On the other hand, if the amount of the propylene-ethylene block copolymer is larger than 80 weight %, the resulting resin composition would fail to show improved impact resistance.

If the amount of the ethylene-α-olefin copolymer elastomer is less than 20 weight %, the resulting resin composition would fail to show improved tensile properties such as tensile elongation at break. On the other hand, If the amount of the ethylene-α-olefin copolymer elastomer is larger than 40 weight %, the resulting resin composition would fail to show improved mechanical strength such as flexural modulus.

If the amount of the inorganic filler is larger than 20 weight %, the resulting resin composition would fail to show improved impact resistance and tensile elongation. Although there is no particular lower limit in the inorganic filler content, 5 weight % or more of the inorganic filler is preferable to achieve sufficient effects.

[2] Second resin composition

The second resin composition of the present invention comprises (a) a multi-stage polymerized propylene-ethylene block copolymer, (b) an ethylene-α-olefin copolymer elastomer, and (c) an inorganic filler like the first resin composition.

(a) Multi-stage polymerized propylene-ethylene block copolymer

The multi-stage polymerized propylene-ethylene block copolymer in the second resin composition may be the same as in the first resin composition. Incidentally, in this resin composition, the number-average molecular weight and weight-average molecular weight of the propylene-ethylene block copolymer may not be particularly restricted.

(b) Ethylene-α-olefin copolymer elastomer

The ethylene-α-olefin copolymer elastomer in the second resin composition may be the same as in the first resin composition, but it is preferable that the ethylene-α-olefin copolymer elastomer has a crystallinity of 20–30%. With respect to the number-average molecular weight and the weight-average molecular weight, the ethylene-α-olefin copolymer elastomer may not be restricted.

In order to have the above crystallinity, it is preferable to use both an ethylene-propylene copolymer elastomer (EPR) and an ethylene-butene copolymer elastomer (EBR). Specifically, it is preferable to use an ethylene-propylene copolymer elastomer (EPR) containing 70–80 mol % of ethylene and 20–30 mol % of propylene and having a crystallinity of 10–20%, and an ethylene-butene copolymer elastomer (EBR) containing 70–85 mol % of ethylene and 15–30 mol % of butene-1 and having a crystallinity of 20–30%. By combining 25–75 weight %, preferably 30–70 weight %, of the ethylene-propylene copolymer elastomer (EPR) and 75–25 weight %, preferably 70–30 weight %, of the ethylene-butene copolymer elastomer (EBR), it is possible to provide the ethylene-α-olefin copolymer elastomer with the desired crystallinity of 20–30%.

Also, the crystallinity of the ethylene-α-olefin copolymer elastomer can be increased by adding polyethylene such as linear low-density polyethylene, low-density polyethylene, ultra low-density polyethylene, etc. to the ethylene-α-olefin copolymer elastomer in such a range that elastomeric properties of the ethylene-α-olefin copolymer elastomer are not deteriorated. Specifically, the polyethylene may be added in an amount of about 20 weight % or less per 100 weight % of the entire resin (including the polyethylene).

(c) Inorganic filler

The inorganic filler in the second resin composition may be the same as in the first resin composition.

(d) P-xylene-soluble component

The p-xylene-soluble component (elastomeric component) contained in the overall resin composition preferably has a crystallinity of 20–30%. If the crystallinity of the elastomeric component is lower than 20%, the elastomeric component does not have sufficient mechanical strength. On the other hand, if the crystallinity of the elastomeric component is higher than 30%, the resin composition would show poor impact resistance.

(e) Proportions of components in second resin composition

The proportions of the above components (a)–(c) in the second resin composition may be the same as in the first resin composition.

[3] Third resin composition

The third resin composition of the present invention comprises (a) a multi-stage polymerized propylene-ethylene block copolymer, (b) an ethylene-α-olefin copolymer elastomer, and (c) an inorganic filler like the first resin composition.

(a) Multi-stage polymerized propylene-ethylene block copolymer

The multi-stage polymerized propylene-ethylene block copolymer in the third resin composition may be the same as in the first resin composition. Incidentally, in the third resin composition, the number-average molecular weight, weight-average molecular weight and crystallinity of the elastomeric components (propylene-ethylene random copolymer portion (ii) and ethylene-α-olefin copolymer elastomer (b)) may not be particularly restricted.

(b) Ethylene-α-olefin copolymer elastomer

The ethylene-α-olefin copolymer elastomer in the third resin composition may be the same as in the first resin composition, but it is preferable that the ethylene-α-olefin copolymer elastomer has a melting point of 50°–70° C. With respect to the number-average molecular weight, the weight-average molecular weight and the crystallinity, the ethylene-α-olefin copolymer elastomer may not be restricted.

Since the ethylene-propylene copolymer elastomer (EPR) including the ethylene-propylene-diene copolymer elastomer (EPDM) has a melting point of 10°–50° C., particularly 30°–50° C., and since the ethylene-butene copolymer elastomer (EBR) has a melting point of 60°–90° C., particularly 70°–90° C., it is preferable to combine the ethylene-propylene copolymer elastomer (EPR) and the ethylene-butene copolymer elastomer (EBR) in order to achieve the above crystallinity. Specifically, by combining 25–75 weight %, preferably 30–70 weight %, of the ethylene-propylene copolymer elastomer (EPR) and 75–25 weight %, preferably 70–30 weight %, of the ethylene-butene copolymer elastomer (EBR), it is possible to provide the ethylene-α-olefin copolymer elastomer with the desired melting point of 50°–70° C.

(c) Inorganic filler

The inorganic filler in the third resin composition may be the same as in the first resin composition.

(d) P-xylene-soluble component

The p-xylene-soluble component (elastomeric component) contained in the overall resin composition preferably has a melting point of 50° C. or higher, more preferably 55°–65° C. If the melting point of the elastomeric component is lower than 50° C., the elastomeric component does not have sufficient heat resistance and high-temperature peeling resistance.

(e) Proportions of components in third resin composition

The proportions of the above components (a)–(e) in the third resin composition are such that the propylene-ethylene block copolymer is 50–80 weight %, preferably 55–75 weight %, the ethylene-α-olefin copolymer elastomer is 20–40 weight %, preferably 20–30 weight %, and the inorganic filler is 20 weight % or less, preferably 5–15 weight %.

[4] Fourth resin composition

The fourth resin composition of the present invention comprises (a) a multi-stage polymerized propylene-ethylene block copolymer, (b) an ethylene-α-olefin copolymer elastomer, and (c) an inorganic filler like the first resin composition.

(a) Multi-stage polymerized propylene-ethylene block copolymer

The propylene-ethylene block copolymer usable in the fourth resin composition are those produced by a multi-stage polymerization method as described above with respect to the first resin composition.

The propylene-ethylene block copolymer produced by the multi-stage polymerization consists essentially of (i) a crystalline propylene homopolymer portion, (ii) a propylene-ethylene random copolymer portion, and (iii) an ethylene homopolymer portion.

The propylene-ethylene random copolymer portion has a low crystallinity, and preferably contains 30–70 weight % of ethylene. If the ethylene content is lower than 30 weight %, or if it exceeds 70 weight %, the resulting resin composition would show undesirably poor ductility.

The multi-stage polymerized propylene-ethylene random copolymer portion preferably has a melt flow rate (MFR, 230° C., 2.16 kg load) of 15–120 g/10 minutes, particularly 60–100 g/10 minutes. If the MFR is lower than 15 g/10 minutes, the resulting resin composition would have poor moldability, particularly injection-moldability. On the other hand, if the MFR is higher than 120 g/10 minutes, the resin composition would be likely to exhibit poor mechanical strength.

The ethylene content in the entire propylene-ethylene block copolymer is preferably 2–10 weight %. Also, On the basis of the total amount (100 weight %) of the components (i)–(iii), the propylene homopolymer portion (i) is preferably 80–95 weight %, the propylene-ethylene random copolymer portion (ii) is preferably 5–20 weight %, and the ethylene homopolymer portion (iii) is preferably 10 weight % or less.

The number-average molecular weight of the propylene-ethylene random copolymer portion (ii) is preferably $20\times10^4$ or more, more preferably $30\times10^4$–$50\times10^4$. Also, the weight-average molecular weight of the propylene-ethylene random copolymer portion (ii) is preferably $60\times10^4$ or more, more preferably $100\times10^4$–$200\times10^4$. If the number-average molecular weight is less than $20\times10^4$ or if the weight-average molecular weight is less than $60\times10^4$, the elastomeric component in the propylene-ethylene block copolymer does not have sufficient mechanical strength, resulting in insufficient peeling resistance of coatings under severe conditions such as high-temperature, high-pressure washing.

In order to achieve the above number-average molecular weight and weight-average molecular weight, it is preferable to reduce a hydrogen concentration in the multi-stage polymerization.

(b) Ethylene-α-olefin copolymer elastomer

The ethylene-α-olefin copolymer elastomer is a copolymer elastomer composed of ethylene and at least one other α-olefin as described with respect to the first resin composition. For instance, an ethylene-propylene copolymer elastomer (EPR), an ethylene-propylene-diene copolymer elastomer (EPDM), an ethylene-butene copolymer elastomer (EBR), etc. are used as the ethylene-α-olefin copolymer elastomer.

Specifically, in the case of the ethylene-propylene copolymer elastomer (EPR) and the ethylene-propylene-diene copolymer elastomer (EPDM), the preferred ethylene content is 50–90 mol % and the preferred propylene content is 50–10 mol %. More preferably, the ethylene content is 70–80 mol % and the propylene content is 30–20 mol %.

The ethylene-propylene copolymer elastomer (EPR) and the ethylene-propylene-diene copolymer elastomer (EPDM) may preferably have a melt flow rate (MFR, 230° C., 2.16 kg load) of 0.5–20 g/10 minutes, and more preferably 0.5–10 g/10 minutes.

The ethylene-butene copolymer elastomer (EBR) preferably has an ethylene content of 70–85 mol %, and a butene-1 content of 30–15 mol %. More preferably, the ethylene content is 75–85 mol % and the butene-1 content is 25–15 mol %. The ethylene-butene copolymer elastomer (EBR) preferably has a melt index (MI, 190° C., 2.16 kg load) of 1–30 g/10 minutes, and more preferably 1–20 g/10 minutes.

(c) Inorganic filler

The inorganic filler in the fourth resin composition may be the same as in the first resin composition.

(d) Proportions of components in fourth resin composition

The proportions of the above components (a)–(c) in the fourth resin composition are such that the propylene-ethylene block copolymer is 50–80 weight %, preferably 55–75 weight %, the ethylene-α-olefin copolymer elastomer is 20–40 weight %, preferably 20–30 weight %, and the inorganic filler is 20 weight % or less, preferably 5–15 weight %.

[5] Fifth resin composition

The fifth resin composition of the present invention comprises (a) a multi-stage polymerized propylene-ethylene block copolymer, (b) an ethylene-α-olefin copolymer elastomer, and (c) an inorganic filler like the first resin composition. (a) Multi-stage polymerized propylene-ethylene block copolymer The multi-stage polymerized propylene-ethylene block copolymer in the fifth resin composition may be the same as in the fourth resin composition. In this propylene-ethylene block copolymer, the ethylene content is 60 weight % or more, preferably 60–70 weight %, and the crystalline ethylene homopolymer portion (iii) is 40 weight % or more, preferably 40–60 weight %, based on the total amount (100 weight %) of the propylene-ethylene random copolymer portion (ii) and the crystalline ethylene homopolymer portion (iii).

If the ethylene content is lower than 60 weight %, or if the ethylene homopolymer portion is lower than 40 weight %, the elastomeric component in the propylene-ethylene block copolymer does not have sufficient mechanical strength, resulting in insufficient peeling resistance of coatings under severe conditions such as high-temperature, high-pressure washing.

The ethylene content in the entire propylene-ethylene block copolymer is preferably 2–15 weight %. Also, On the basis of the total amount (100 weight %) of the components (i)–(iii), the propylene homopolymer portion (i) is preferably 0–95 weight %, more preferably 80–90 weight %, the propylene-ethylene random copolymer portion (ii) is preferably 5–20 weight %, more preferably 5–10 weight %, and the ethylene homopolymer portion (iii) is preferably 10 weight % or less, more preferably 5–10 weight %.

Incidentally, in this resin composition, the number-average molecular weight and weight-average molecular weight of the propylene-ethylene block copolymer may not be particularly restricted.

In order to achieve the above ethylene content, it is preferable to increase a ratio of ethylene to propylene in the multi-stage polymerization.

(b) Ethylene-α-olefin copolymer elastomer

The ethylene-α-olefin copolymer elastomer in the fifth resin composition may be the same as in the first resin composition.

(c) Inorganic filler

The inorganic filler in the fifth resin composition may be the same as in the first resin composition.

(d) Proportions of components in fifth resin composition

The proportions of the above components (a)–(c) in the fifth resin composition are such that the propylene-ethylene block copolymer is 50–80 weight %, preferably 55–75 weight %, the ethylene-α-olefin copolymer elastomer is 20–40 weight %, preferably 20–30 weight %, and the inorganic filler is 20 weight % or less, preferably 5–15 weight %.

[6] Sixth resin composition

The sixth resin composition of the present invention comprises (a) a multi-stage polymerized propylene-ethylene block copolymer, (b 1) an ethylene-propylene copolymer elastomer, (b2) an ethylene-butene copolymer elastomer, and (c) an inorganic filler.

(a) Multi-stage polymerized propylene-ethylene block copolymer

The propylene-ethylene block copolymer produced by a multi-stage polymerization method consists essentially of (i) a crystalline propylene homopolymer portion, (ii) a propylene-ethylene random copolymer portion, and (iii) an ethylene homopolymer portion.

The propylene homopolymer portion (i) preferably has an intrinsic viscosity $[\eta]_H$ of 0.9–1.2 dl/g. If the intrinsic viscosity $[\eta]_H$ flirt is lower than 0.9 dl/g, the resin composition would show poor ductility. On the other hand, if the intrinsic viscosity $[\eta]_H$ is higher than 1.2 dl/g, the resin composition would show poor flowability.

The propylene-ethylene random copolymer portion (ii) has a low crystallinity, and preferably contains 30–70 weight of ethylene. If the ethylene content is lower than 30 weight %, or if it exceeds 70 weight %, the resulting resin composition would show undesirably poor ductility.

The propylene-ethylene random copolymer portion (ii) preferably has an intrinsic viscosity $[\eta]_{cxs}$ of 4.0 dl/g or more. If the intrinsic viscosity $[\eta]_{cxs}$ is lower than 4.0 dl/g, the resin composition would not show sufficient impact resistance. The preferred intrinsic viscosity $[\eta]_{cxs}$ is 4–10 dl/g.

The ethylene content in the entire propylene-ethylene block copolymer is preferably 2–10 weight %, preferably 2–5 weight %. Also, On the basis of the total amount (100 weight %) of the components (i)–(iii), the propylene homopolymer portion (i) is preferably 80–95 weight %, more preferably 90–96 weight %, the propylene-ethylene random copolymer portion (ii) is preferably 5–20 weight %, more preferably 4–10 weight %, and the ethylene homopolymer portion (iii) is preferably 10 weight % or less, more preferably 5 weight % or less.

The multi-stage polymerized propylene-ethylene block copolymer preferably shows a melt flow rate (MFR, 230° C., 2.16 kg load) of 40–120 g/10 minutes, particularly 60–100 g/10 minutes. If the MFR is lower than 40 g/10 minutes, the resulting resin composition would have poor moldability, particularly injection-moldability. On the other hand, if the MFR is higher than 120 g/10 minutes, the resin composition would be likely to exhibit poor mechanical strength. (b) Ethylene-α-olefin copolymer elastomer The ethylene-α-olefin copolymer elastomer in the sixth resin composition may be the same as in the first resin composition.

(c) Inorganic filler

The inorganic filler in the fifth resin composition may be the same as in the first resin composition.

(d) Intrinsic viscosity ratio

The sixth resin composition should meet the requirement that a ratio of the intrinsic viscosity $[\eta]_B$ of the other polymer component than the propylene homopolymer portion in the resin composition to the intrinsic viscosity $[\eta]_A$ of the propylene homopolymer portion, which is simply referred to as "B/A ratio", is within the range of 0.1–2.5. Outside the above range, the injection moldings of the resin composition would show large molding shrinkage and linear expansion coefficient, leading to poor dimension stability. Particularly, the dimension stability required for large moldings (molding shrinkage: less than 8/1000, and linear expansion coefficient: less than $8 \times 10^5$/°C.) cannot be obtained if the above intrinsic viscosity ratio requirement is not met.

(e) Proportions of components in sixth resin composition

The proportions of the above components (a)–(c) in the sixth resin composition are such that the multi-stage polymerized propylene-ethylene block copolymer (a) is 50–80 weight %, preferably 55–75 weight %, the ethylene-propylene copolymer elastomer (b1) is 10–20 weight %, preferably. 5–15 weight %, the ethylene-butene copolymer elastomer (b2) is 10–20 weight %, preferably 5–15 weight %, and the inorganic filler (c) is 20 weight % or less, preferably 5–15 weight %. Incidentally, the total amount of the ethylene-propylene copolymer elastomer (b 1) and the ethylene-butene copolymer elastomer (b2) is preferably 20–40 weight %, particularly 25–35 weight %.

If the amount of the propylene-ethylene block copolymer is less than 50 weight %, the resulting resin composition would fail to show improved elongation. On the other hand, if the amount of the propylene-ethylene block copolymer is larger than 80 weight %, the resulting resin composition would fail to show improved impact resistance.

If the amount of the ethylene-propylene copolymer elastomer is less than 10 weight %, the resulting resin composition would fail to show improved tensile properties such as tensile elongation at break. On the other hand, If the amount of the ethylene-propylene copolymer elastomer is larger than 20 weight %, the resulting resin composition would fail to show improved mechanical strength such as flexural modulus.

If the amount of the ethylene-butene copolymer elastomer is less than 10 weight %, the resulting resin composition would fail to show improved hardness On the other hand, If the amount of the ethylene-butene copolymer elastomer is larger than 20 weight %, the resulting resin composition would fail to show improved mechanical strength such as flexural modulus.

If the total amount of the ethylene-propylene copolymer elastomer and the ethylene-butene copolymer elastomer is less than 20 weight %, the resulting resin composition would fail to show improved tensile elongation at break and impact resistance. On the other hand, If the total amount of the ethylene-propylene copolymer elastomer and the ethylene-butene copolymer elastomer is larger than 40 weight %, the resulting resin composition would fail to show improved flexural modulus, hardness, thermal deformation resistance, etc.

If the amount of the inorganic filler is larger than 20 weight %, the resulting resin composition would fail to show improved impact resistance and tensile elongation. Although there is no particular lower limit in the inorganic filler content, 5 weight % or more of the inorganic filler is preferable to achieve sufficient effects.

By satisfying two or more requirements in the above first to sixth resin compositions, it is possible to provide a resin composition with highly improved paint coatability, peeling resistance of coatings formed thereon, and other properties.

[B] Other components in resin composition

To improve the properties of the first to sixth resin compositions, various other additives such as heat stabilizers, antioxidants, photostabilizers, flame retardants, plasticizers, antistatic agents, parting agents, foaming agents, etc. may be added.

Typical examples of the preferred combinations of the parameters other than those of the first to sixth resin compositions will be shown below.

(1) Components in the components (a) and (b), which are soluble in p-xylene at a room temperature, have an Mn of $4 \times 10^4$ or more, an Mw of $20 \times 10^4$ or more, and a crystallinity of 0–30%.

(2) Components in the components (a) and (b), which are soluble in p-xylene at a room temperature, have an Mn of $4 \times 10^4$ or more, an Mw of $20 \times 10^4$ or more, and a melting point of 50° C. or higher.

(3) Components in the components (a) and (b), which are soluble in p-xylene at a room temperature, have a crystallinity of 20–30%, and a melting point of 50° C. or higher.

(4) Components in the components (a) and (b), which are soluble in p-xylene at a room temperature, have an Mn of $4 \times 10^4$ or more, an Mw of $20 \times 10^4$ or more, a crystallinity of 20–30%, and a melting point of 50° C. or higher.

(5) The propylene-ethylene random copolymer portion has a number of $20 \times 10^4$ or more and an Mw of $60 \times 10^4$ or more, and an ethylene content is 60 weight % or more and the ethylene homopolymer portion (iii) is 40 weight % or more based on the total amount of (ii) and (iii).

[C] Method of producing resin compositions

The first to sixth resin compositions of the present invention can be produced by blending the components at 150°–300° C., preferably 190°–250° C. in a single-screw extruder or a double-screw extruder.

The present invention will be explained in further detail by way of the following Examples without intention of restricting the scope of the present invention.

EXAMPLES 1–12, COMPARATIVE EXAMPLES 1 AND 2

Starting materials used in these Examples and Comparative Examples are as follows:

(a) Multi-stage polymerized propylene-ethylene block copolymer

B PP-1: [ethylene content: 4 weight %, melt flow rate (MFR, 230° C., 2.16 kg load): 60 g/10 minutes].

(b1) Ethylene-propylene copolymer elastomer

EPR-1: [propylene content: 23 weight %, melt flow rate (MFR, 230° C., 2.16 kg load): 0.8 g/10 minutes, hardness (JIS A): 74, melting point: 43° C., crystallinity: 11%, number-average molecular weight: $5.7 \times 10^4$, weight-average molecular weight: $14.2 \times 10^4$].

EPR-2: [propylene content: 22 weight %, melt flow rate (MFR, 230° C., 2.16 kg load): 3.6 g/10 minutes, hardness (JIS A): 73, melting point: 41.3° C., crystallinity: 12%, number-average molecular weight: $4.5 \times 10^4$, weight-average molecular weight: $9.9 \times 10^4$].

(b2) Ethylene-butene copolymer elastomer

EBR-1: [butene-1 content: 20 weight %, melt index (MI, 190° C., 2.16 kg load): 1.3 g/10 minutes, hardness (JIS A): 87, melting point: 78.2° C., crystallinity: 26%, number-average molecular weight: $6.5 \times 10^4$, weight-average molecular weight: $12.7 \times 10^4$].

EBR-2: [butene-1 content: 20 weight %, melt index (MI, 190° C., 2.16 kg load): 3.5 g/10 minutes, hardness (JIS A): 85, melting point: 70.8° C., crystallinity: 25%, number-average molecular weight: $3.8 \times 10^4$, weight-average molecular weight: $8.3 \times 10^4$].

(c) Inorganic filler

Talc: [LMS300 available from Fuji Talc K.K., average size: 1.25 μm]

(d) Linear low-density polyethylene

LLDPE: [density: 0.930 g/cm³, melt index (MI, 190° C., 2.16 kg load): 1.0 g/10 minutes].

A multi-stage polymerized propylene-ethylene block copolymer (BPP-1), an ethylene-propylene copolymer elastomer (EPR-1, EPR-2), an ethylene-butene copolymer elastomer (EBR-1, EBR-2), talc and optionally linear low-density polyethylene were dry-blended in proportions shown in Table 1 below by a supermixer and introduced into a double-screw extruder to conduct their blending at 190°–250° C. and at 200 rpm to produce composition pellets.

The resulting composition was dissolved in boiling p-xylene to separate out an inorganic filler (talc) as an insoluble component, and then cooled to separate out a propylene homopolymer portion and an ethylene homopolymer portion as insoluble components. The remaining elastomeric component was measured with respect to a weight-average molecular weight (Mw), a number-average molecular weight (Mn), a crystallinity and a melting point. The results are shown in Table 1.

TABLE 1

| Example No. | 1 | 2 | 3 | 4 | 5 |
| --- | --- | --- | --- | --- | --- |
| Composition (parts by weight) | | | | | |
| BPP-1 | 60 | 60 | 60 | 60 | 60 |
| EPR-1 | 15 | 15 | 20 | — | — |
| EPR-2 | — | — | — | 15 | 15 |
| EBR-1 | 15 | — | — | — | 15 |
| EBR-2 | — | 15 | 10 | 15 | — |
| Talc | 10 | 10 | 10 | 10 | 10 |
| Properties of Elastomeric Component | | | | | |
| Mn $(\times 10^4)^{(1)}$ | 4.8 | 4.7 | 4.6 | 3.5 | 3.8 |
| Mw $(\times 10^4)^{(2)}$ | 22.2 | 21.4 | 21.0 | 16.0 | 18.0 |
| Crystallinity (%)$^{(3)}$ | 21.5 | 21.3 | 19.8 | 21.4 | 21.6 |
| Melting Point (°C.)$^{(4)}$ | 57.3 | 49.8 | 49.6 | 49.7 | 56.8 |
| Example No. | 6 | 7 | 8 | 9 | 10 |
| Composition (parts by weight) | | | | | |
| BPP-1 | 60 | 60 | 60 | 63 | 58 |
| EPR-1 | — | 20 | — | 15 | 20 |
| EPR-2 | 20 | — | — | — | — |
| EBR-1 | 10 | 10 | 30 | 10 | 15 |
| Talc | 10 | 10 | 10 | 12 | 7 |
| Properties of Elastomeric Component | | | | | |
| Mn $(\times 10^4)^{(1)}$ | 3.9 | 4.3 | 3.7 | 4.7 | 4.4 |
| Mw $(\times 10^4)^{(2)}$ | 18.5 | 20.5 | 17.7 | 21.2 | 21.0 |
| Crystallinity (%)$^{(3)}$ | 18.9 | 19.6 | 24.8 | 20.2 | 20.5 |
| Melting Point (°C.)$^{(4)}$ | 55.2 | 55.3 | 62.2 | 55.8 | 55.1 |
| No. | 11* | 12* | 1** | 2** |
| Composition (parts by weight) | | | | |
| BPP-1 | 60 | 60 | 60 | 60 |
| EPR-1 | 15 | 15 | — | — |
| EPR-2 | — | — | 20 | 30 |
| EBR-1 | — | 10 | — | — |
| EBR-2 | — | — | 10 | — |
| LLDPE | 15 | 5 | — | — |
| Talc | 10 | 10 | 10 | 10 |
| Properties of Elastomeric Component | | | | |
| Mn $(\times 10^4)^{(1)}$ | 4.6 | 4.8 | 3.9 | 4.2 |
| Mw $(\times 10^4)^{(2)}$ | 20.5 | 22.4 | 18.3 | 16.0 |
| Crystallinity (%)$^{(3)}$ | 23.4 | 22.0 | 19.7 | 14.3 |
| Melting Point (°C.)$^{(4)}$ | 58.2 | 57.4 | 49.6 | 41.3 |

Note:
$^{(1)}$Number-average molecular weight measured by GPC.
$^{(2)}$Weight-average molecular weight measured by GPC.
$^{(3)}$Measured by a small-angle X-ray scattering method.
$^{(4)}$Measured by a differential scanning calorimeter.
*Example.
**Comparative Example.

The composition pellets were injection-molded at 210° C. to form specimens for measuring their properties (melt flow rate, flexural modulus, Izod impact strength, peeling resistance of coating formed thereon, and resistance to washing). The results are shown in Table 2.

TABLE 2

| Example No. | 1 | 2 | 3 | 4 | 5 | 6 | 7 | 8 | 9 | 10 | 11 | 12 | 1 | 2 |
|---|---|---|---|---|---|---|---|---|---|---|---|---|---|---|
| Flexural Modulus[1] | 15500 | 15900 | 14600 | 15000 | 15000 | 14500 | 14800 | 15000 | 18000 | 12500 | 14300 | 14800 | 15000 | 12000 |
| Izod Impact Strength at −30° C.[2] | 7 | 7 | 8 | 5 | 6 | 6 | 7 | 4 | 4 | 8 | 6 | 6 | 6 | 7 |
| Peeling Resistance[3] | | | | | | | | | | | | | | |
| at 23° C. | 1550 | 1600 | 1560 | 1580 | 1610 | 1540 | 1500 | 1600 | 1520 | 1570 | 1560 | 1580 | 1500 | 1000 |
| at 60° C. | 450 | 400 | 340 | 350 | 370 | 300 | 320 | 380 | 350 | 410 | 440 | 420 | 180 | 150 |
| Resistance to Room-Temp., High-Pressure Washing[4] | O | O | O | O | O | O | O | O | O | O | O | O | X | X |
| Resistance to High-Temp., High-Pressure Washing[5] | O | O | O | O | O | O | O | O | O | O | O | O | X | X |

Note:
[1]Flexural modulus (unit: kgf/cm$^2$) measured according to ASTM D790.
[2]Izod impact strength (unit: kgf-cm/cm): Measured on a notched 3.2-mm-thick specimen according to ASTM D256.
[3]Peeling resistance (unit: g/10 mm): A sheet specimen of 150 mm × 70 mm × 3 mm subjected to tetra-chloroethane vapor washing was coated with a primer and an acrylic melamine top paint, and baked at 120° C. for 30 minutes to obtain a coated plate. The paint coat was peeled from the plate in a 10-mm width by a tensile test machine at a peeling angle of 180° at 23° C. and 60° C., respectively to measure the peeling resistance.
[4]Resistance to room-temperature, high-pressure washing: A partially masked specimen was coated in the same manner as in the peeling resistance test (3) above. Water at 23° C. was jetted from a nozzle of 3 mm in diameter positioned at a height of 100 mm at a pressure of 80 kg/cm$^2$ onto a boundary area between a coated surface and an uncoated surface of the specimen. By observing the coat conditions after washing, evaluation was conducted by the following standards:
O: No change.
Δ: Slight change.
X: Coat layer peeled off.
[5]Resistance to high-temperature, high-pressure washing: A partially masked specimen was coated in the same manner as in the peeling resistance test (3) above. Water at 60° C. was jetted from a nozzle of 3 mm in diameter positioned at a height of 100 mm at a pressure of 80 kg/cm$^2$ onto a boundary area between a coated surface and an uncoated surface of the specimen. By observing the coat conditions after washing, evaluation was conducted by the following standards:
O: No change.
Δ: Slight change.
X: Coat layer peeled off.

As is clear from Table 2, the resin compositions of the present invention are excellent in paint coatability, peeling resistance at high temperature and resistance to high-temperature, high-pressure washing.

EXAMPLES 13–17, COMPARATIVE EXAMPLE 3

Starting materials used in these Examples and Comparative Examples are as follows:

(a) Multi-stage polymerized propylene-ethylene block copolymers shown in Table 3 below.

TABLE 3

| No. | BPP-2 | BPP-3 | BPP-4 | BPP-5 | BPP-6 |
|---|---|---|---|---|---|
| Propylene-Ethylene Block Copolymer | | | | | |
| MFR (g/10 minutes)[1] | 55 | 50 | 45 | 65 | 40 |
| Ethylene Content (wt %) | 5.2 | 5.7 | 5.5 | 5.1 | 6.5 |
| Propylene-Ethylene Random Copolymer Portion* | | | | | |
| Mn (×10$^4$)[2] | 42.5 | 20.6 | 39.8 | 11.0 | 10.5 |
| Mw (×10$^5$)[3] | 12 | 9 | 11 | 4 | 4 |
| Propylene-Ethylene Random Copolymer Portion + Ethylene Homopolymer Portion** | | | | | |
| Ethylene Content (wt %)[4] | 65 | 60 | 50 | 62 | 50 |
| Ethylene Homopolymer Portion*** Content (wt %)[5] | 42.3 | 41.5 | 30.2 | 43 | 20.2 |

Note:
*The propylene-ethylene block copolymer was dissolved in boiling p-xylene and cooled to separate out crystalline propylene homopolymer portion and ethylene homo-polymer portion as insoluble components. The remaining portion was collected as a propylene-ethylene random copolymer portion.
**The propylene-ethylene block copolymer was introduced into p-xylene at 100° C. to separate out a crystalline propylene homopolymer portion as an insoluble component, and a mixture of a propylene-ethylene random copolymer portion and a crystalline ethylene homopolymer portion dissolved in p-xylene was collected.
***A mixture of a propylene-ethylene random copolymer portion and a crystalline ethylene homopolymer portion was introduced into p-xylene at a room temperature to separate out a crystalline ethylene homopolymer portion as an insoluble component. The

TABLE 3-continued content of crystalline ethylene homopolymer was expressed as a percentage per 100 weight % of the propylene-ethylene random copolymer portion and the crystalline ethylene homopolymer portion.
(1)MFR: Measured at 230° C. under a load of 2.16 kg according to ASTM D1238.
(2)Number-average molecular weight: Measured by GPC.
(3)Weight-average molecular weight: Measured by GPC.
(4)Content of ethylene in a mixture of the propylene-ethylene random copolymer portion and the ethylene homopolymer portion: Measured by infrared spectroscopy.
(5)Content of an ethylene homopolymer portion in a mixture of the propylene-ethylene random copolymer portion and the ethylene homopolymer portion: Measured by NMR.
(b1) Ethylene-propylene copolymer elastomer
EPR-1: [propylene content: 23 weight %, melt flow rate (MFR, 230° C., 2.16 kg load): 0.8 g/10 minutes, hardness (JIS A): 74, melting point: 43° C., crystallinity: 11%, number-average molecular weight: $5.7 \times 10^4$, weight-average molecular weight: $14.2 \times 10^4$].
(b2) Ethylene-butene copolymer elastomer
EBR-1: [butene-1 content: 20 weight %, melt index (MI, 190° C., 2.16 kg load): 1.3 g/10 minutes, hardness (JIS A): 87, melting point: 78.2° C., crystallinity: 26%, number-average molecular weight: $6.5 \times 10^4$, weight-average molecular weight: $12.7 \times 10^4$].
(c) Inorganic filler
Talc: [LMS300 available from Fuji Talc K.K., average size: 1.25 μm]

A multi-stage polymerized propylene-ethylene block copolymer (BPP-1), an ethylene-propylene copolymer elastomer (EPR-1), an ethylene-butene copolymer elastomer (EBR-1) and talc were dry-blended in proportions shown in Table 4 below by a supermixer and introduced into a double-screw extruder to conduct their blending at 190°–250° C. and at 200 rpm to produce composition pellets.

TABLE 4

| No.* | 13 | 14 | 15 | 16 | 17 | 3 |
|---|---|---|---|---|---|---|
| | (weight %) | | | | | |
| BPP-2 | 60 | — | — | — | 60 | — |
| BPP-3 | — | 60 | — | — | — | — |
| BPP-4 | — | — | 60 | — | — | — |
| BPP-5 | — | — | — | 60 | — | — |
| BPP-6 | — | — | — | — | — | 60 |
| EPR-1 | 30 | 30 | 30 | 30 | 25 | 30 |
| EBR-1 | — | — | — | — | 5 | — |
| Talc | 10 | 10 | 10 | 10 | 10 | 10 |

Note: *Nos. 13–17 are Examples and No. 3 is Comparative Example.

The composition pellets were injection-molded at 210° C. to form specimens for measuring their properties (melt flow rate, flexural modulus, Izod impact strength, peeling resistance of coating formed thereon, and resistance to washing). The results are shown in Table 5.

TABLE 5

| Example No. | 13 | 14 | 15 | 16 | 17 | 3 |
|---|---|---|---|---|---|---|
| Flexural Modulus(1) | 11500 | 11800 | 11000 | 11900 | 12000 | 10000 |
| Izod Impact Strength at −30° C.(2) | 6 | 6 | 7 | 5 | 5 | 6 |
| Peeling Resistance(3) | | | | | | |
| at 23° C. | 1400 | 1390 | 1380 | 1500 | 1450 | 1000 |
| at 60° C. | 350 | 290 | 280 | 330 | 350 | 180 |

TABLE 5-continued

| Example No. | 13 | 14 | 15 | 16 | 17 | 3 |
|---|---|---|---|---|---|---|
| Resistance to Room-temp., High-Pressure Washing(4) | ◯ | ◯ | ◯ | ◯ | ◯ | X |
| Resistance to High-Temp., high-Pressure, Washing(5) | ◯ | ◯ | ◯ | ◯ | ◯ | X |

Note: (1)–(5) The same as shown in Note under Table 2.

As is clear from Table 5, the resin composition of the present invention are excellent in paint coatability, peeling resistance at high temperature and peeling resistance to high-temperature, high-pressure washing.

EXAMPLES 18–24, COMPARATIVE EXAMPLE 4–12

Starting materials used in these Examples and Comparative Examples are as follows:

(a) Two-stage polymerized propylene-ethylene block copolymer shown in Table 6.

TABLE 6

| Type | MFR(1) (g/10 min) | $[\eta]_H$(2) (dl/g) | $[\eta]_{CXS}$(3) (dl/g) | Content of Copolyer(4) | Content of Ethylene(5) |
|---|---|---|---|---|---|
| BPP-7 | 60.0 | 1.0 | 4.6 | 8.0 | 50 |
| BPP-8 | 70.0 | 0.9 | 5.1 | 8.0 | 50 |
| BPP-9 | 60.0 | 1.1 | 4.0 | 6.0 | 50 |
| BPP-10 | 70.0 | 1.0 | 4.5 | 6.0 | 50 |
| BPP-11 | 60.0 | 1.2 | 4.4 | 5.0 | 50 |
| BPP-12 | 70.0 | 1.0 | 4.8 | 5.0 | 50 |
| BPP-13 | 70.0 | 1.2 | 4.0 | 13.0 | 60 |
| BPP-14 | 40.0 | 1.2 | 2.7 | 13.0 | 50 |

Note:
(1)MFR: Measured at 230° C. under a load of 2.16 kg according to ASTM D1238.
(2)$[\eta]_H$: Intrinsic viscosity of a propylene homopolymer portion in the propylene-ethylene block copolymer.
(3)$[\eta]_{CXS}$: Intrinsic viscosity of a copolymer portion (propylene-ethylene random copolymer portion) in the propylene-ethylene block copolymer.
(4)Content (weight %) of a copolymer portion (propylene-ethylene random copolymer portion) in the propylene-ethylene block copolymer.
(5)Content (weight %) of ethylene in the propylene-ethylene random copolymer portion.?
(b1) Ethylene-propylene copolymer elastomer
EPR-1: [propylene content: 23 weight %, melt flow rate (MFR, 230° C., 2.16 kg load): 0.8 g/10 minutes, hardness (JIS A): 74, melting point: 43° C., crystallinity: 11%, number-average molecular weight: $5.7 \times 10^4$, weight-average molecular weight: $14.2 \times 10^4$].
EPR-2: [propylene content: 22 weight %, melt flow rate (MFR, 230° C., 2.16 kg load): 3.6 g/10 minutes, hardness (JIS A): 73, melting point: 41.3° C., crystallinity: 12%, number-average molecular weight: $4.5 \times 10^4$, weight-average molecular weight: $9.9 \times 10^4$].
EPR-3: [propylene content: 23 weight %, intrinsic viscosity [η] (in decalin at 135° C.): 2.5 dl/g].
(b2) Ethylene-butene copolymer elastomer
EBR-2: [butene-1 content: 20 weight %, melt index (MI, 190° C., 2.16 kg load): 3.5 g/10 minutes, hardness (JIS A): 85, melting point: 70.8° C., crystallinity: 25%, number-average molecular weight: $3.8 \times 10^4$, weight-average molecular weight: $8.3 \times 10^4$].
EBR-3: [butene-1 content: 17 weight %, melt index (MI, 190° C., 2.16 kg load): 20 g/10 minutes, hardness (JIS A): 89]).
EBR-4: [butene-1 content: 20 weight %, intrinsic viscosity [η] (in decalin at 135° C.): 2.0 dl/g].
(c) Inorganic filler
Talc: [LMS300 available from Fuji Talc K.K., average size: 1.25 μm]

Multi-stage polymerized propylene-ethylene block copolymers (BPP-7–BPP-14), ethylene-propylene copolymer elastomers (EPR-1–EPR-3), ethylene-butene copolymer elastomers (EBR-2–EBR-4) and talc were dry-blended in proportions shown in Table 7 below by a supermixer and introduced into a double-screw extruder to conduct their blending at 190°–250° C. and at 200 rpm to produce composition pellets.

TABLE 7

(weight %)

| | Example No. | | | | | | |
|---|---|---|---|---|---|---|---|
| | 18 | 19 | 20 | 21 | 22 | 23 | 24 |
| BPP | | | | | | | |
| Type | BPP-7 | BPP-7 | BPP-8 | BPP-9 | BPP-10 | BPP-11 | BPP-12 |
| Amount | 57.3 | 59.0 | 59.0 | 61.4 | 59.4 | 58.7 | 59.7 |
| EPR-1 | 15.2 | 15.6 | 15.6 | 15.4 | 17.4 | — | — |
| EPR-2 | — | — | — | — | — | 18.1 | — |
| EBR-2 | 12.5 | 12.9 | 12.9 | 13.2 | 13.2 | 13.2 | — |
| EBR-3 | — | — | — | — | — | — | 13.2 |
| Talc | 15.0 | 12.5 | 12.5 | 10.0 | 10.0 | 10.0 | 10.0 |

| | Com. Ex. No. | | | | | | | |
|---|---|---|---|---|---|---|---|---|
| | 4 | 5 | 6 | 7 | 8 | 9 | 10 | 11 | 12 |
| BPP | | | | | | | | | |
| Type | BPP-7 | BPP-8 | BPP-9 | BPP-10 | BPP-11 | BPP-12 | BPP-13 | BPP-14 | BPP-8 |
| Amount | 62.0 | 66.8 | 54.0 | 60.7 | 67.8 | 62.0 | 60.9 | 60.9 | 65.0 |
| EPR-1 | 21.0 | 7.8 | 13.5 | 22.3 | — | — | — | — | — |
| EPR-2 | — | — | — | — | 9.0 | 21.4 | 11.6 | 11.6 | — |
| EPR-3 | — | — | — | — | — | — | — | — | 15.0 |
| EBR-2 | 12.0 | 12.9 | 22.5 | 12.0 | 13.2 | — | — | — | — |
| EBR-3 | — | — | — | — | — | 6.6 | 12.5 | 12.5 | — |
| EBR-4 | — | — | — | — | — | — | — | — | 10.0 |
| Talc | 5.0 | 12.5 | 10.0 | 5.0 | 10.0 | 10.0 | 15.0 | 15.0 | 10.0 |

The composition pellets were injection-molded at 210° C. and at a pressure of 600 kg/cm² to form specimens for measuring their properties (melt flow rate, tensile elongation at break, flexural modulus, Izod impact strength, thermal deformation resistance, Rockwell hardness, heat sag, brittle temperature, molding shrinkage, linear expansion coefficient, and intrinsic viscosity ratio of other polymer components than the propylene homopolymer portion in the resin composition to the propylene homopolymer portion). The results are shown in Table 8.

TABLE 8

| | No.* | | | | | | | |
|---|---|---|---|---|---|---|---|---|
| | 18 | 19 | 20 | 21 | 22 | 23 | 24 | 4 |
| MFR[(1)] | 17 | 18 | 19 | 19 | 19 | 18 | 18 | 19 |
| Tensile Elongation at Break[(2)] | 450 | 540 | 540 | 580 | 560 | 640 | 510 | 580 |
| Flexural Modulus[(3)] | 15500 | 14700 | 14700 | 14700 | 14800 | 14500 | 14500 | 12700 |
| Izod Impact at 23° C. | 35 | 38 | 40 | 3 8 | 40 | 32 | 35 | 42 |
| Strength[(4)] at −30° C. | 6.5 | 6.8 | 6.8 | 5.8 | 5.8 | 5.0 | 5.0 | 7.0 |
| Thermal Deformation Temp.[(5)] | 117 | 114 | 114 | 114 | 114 | 112 | 112 | 108 |
| Rockwell Hardness[(6)] | 59 | 57 | 57 | 59 | 58 | 58 | 58 | 51 |
| Heat Sag[(7)] | 4.7 | 5.1 | 5.1 | 5.0 | 5.4 | 5.3 | 5.3 | 6.2 |
| Brittle Temp.[(8)] | −28 | −32 | −34 | −32 | −36 | −35 | −36 | −35 |
| Molding Shrinkage[(9)] | 5.3 | 5.7 | 5.9 | 6.5 | 6.4 | 6.6 | 6.4 | 6.7 |
| Linear Expansion Coefficient[(10)] | 6.5 | 6.9 | 7.0 | 7.3 | 7.1 | 7.4 | 7.2 | 7.3 |
| Intrinsic Viscosity Ratio (B/A)[(11)] | 2.1 | 2.1 | 2.3 | 1.8 | 2.0 | 1.4 | 1.5 | —** |

| | No.* | | | | | | | |
|---|---|---|---|---|---|---|---|---|
| | 5 | 6 | 7 | 8 | 9 | 10 | 11 | 12 |
| MFR[(1)] | 22 | 15 | 20 | 21 | 19 | 22 | 18 | 16 |
| Tensile Elongation at Break[(2)] | 380 | 620 | 580 | 420 | 280 | 50 | 200 | 520 |
| Flexural Modulus[(3)] | 15800 | 13500 | 13800 | 15500 | 15500 | 16000 | 16000 | 14000 |
| Izod Impact at 23° C. | 35 | 42 | 40 | 35 | 32 | 35 | 40 | 37 |
| Strength[(4)] at −30° C. | 5.8 | 6.2 | 6.0 | 5.2 | 4.8 | 5.0 | 5.0 | 5.8 |
| Thermal Deformation Temp.[(5)] | 117 | 110 | 112 | 115 | 114 | 116 | 116 | 115 |
| Rockwell Hardness[(6)] | 62 | 55 | 53 | 60 | 58 | 57 | 56 | 59 |
| Heat Sag[(7)] | 4.8 | 5.8 | 5.8 | 5.0 | 5.0 | 4.6 | 4.8 | 4.8 |
| Brittle Temp.[(8)] | −23 | −36 | −38 | −27 | −35 | −20 | −16 | −30 |
| Molding Shrinkage[(9)] | 8.2 | 6.1 | 6.9 | 8.5 | 6.6 | 5.7 | 5.7 | 8.2 |
| Linear Expansion Coefficient[(10)] | 7.8 | 6.8 | 7.5 | 8.2 | 7.3 | 6.7 | 6.4 | 8.1 |
| Intrinsic Viscosity Ratio (B/A)[(11)] | —** | —** | —** | —** | —** | —** | —** | 2.9 |

Note:
*Nos. 18–24 are Examples and Nos. 4–12 are Comparative Examples.
**Not measured.
[(1)]MTR (unit: g/10 minutes): Measured at 230° C. under a load of 2160 g according to ASTM D1238.
[(2)]Tensile elongation at break (unit: %): Measured according to ASTM D638.
[(3)]Flexural modulus (unit: kgf/cm$^2$): Measured according to ASTM D790.
[(4)]Izod impact strength (unit: kgf · cm/cm): Measured on a notched 3.2-mm-thick specimen according to ASTM D256.
[(5)]Thermal deformation temperature (unit: °C.): Measured under a pressure of 4.6 kg/cm$^2$ according to ASTM D648.
[(6)]Rockwell hardness (R): Measured according to ASTM D785.
[(7)]Heat sag (unit: mm): Measured at 120° C. on a specimen of 2 mm in thickness, 25 mm in width and an overhang of 100 mm.
[(8)]Brittle temperature (unit: °C.): Measured according to ASTM D746.
[(9)]Molding shrinkage (× 1/1000): A sheet of 350 mm × 10 mm × 3 mm was molded and placed in a constant-temperature chamber at 20° C. for 24 hours to measure a shrinkage ratio of the sheet in a transverse direction (TD) and in a longitudinal direction (MD). An average of the measured shrinkage ratios was listed in the table.
[(10)]Linear expansion coefficient (× 10$^{-5}$/°C.): Measured in a temperature range of −30° C. to +80° C. on the same specimen as in the above molding shrinkage test (9) both in a transverse direction (TD) and in a longitudinal direction (MD). Their average value was listed in the table.
[(11)]Ratio ($[\theta]_B/[\eta]_A$) of intrinsic viscosity ($[\eta]_B$) of other polymer components than propylene homopolymer portion to intrinsic viscosity ($[\eta]_A$) of propylene homopolymer portion: Talc was removed from components insoluble in xylene at a room temperature, and the remaining polymer component in xylene was heated to 100° C. to separate out an ethylene homopolymer portion. The remaining portion (propylene homopolymer portion) was measured with respect to a viscosity in decalin at 135° C. The viscosity was also measured on the other component than the propylene homopolymer portion in decalin at 135° C.. A ratio of $[\eta]_B$ to $[\eta]_A$ was calculated.

As is clear from Table 8, the resin compositions of the present invention are excellent in moldability (expressed by MFR), tensile elongation at break, paint coatability, flexural modulus, impact resistance, thermal deformation resistance, Rockwell hardness, heat sag, brittle temperature, molding shrinkage and linear expansion coefficient. On the other hand, those of Comparative Examples are poor in at least one of these properties. Incidentally, in Comparative Example 12, in which the intrinsic viscosity ratio was outside the range required on the sixth resin composition of the present invention, the resin composition showed poor molding shrinkage and linear expansion coefficient though it had good mechanical strength and moldability.

All specimens of Examples and Comparative Examples were washed with a trichloroethane vapor, coated with a primer and a urethane topcoat paint according to a standard coating method, and a cross-cut adhesion test was conducted before and after immersion in warm water at 40° C. for 240 hours to observe the adhesion and blisters of the coat. As a result, it was confirmed that all specimens of Examples showed good adhesion of the coat with no blisters. Therefore, it can be concluded that the resin compositions of the present invention are excellent in paint coatability expressed by adhesion and water resistance, etc.

As described above in detail, since the resin composition of the present invention comprises a multi-stage polymerized propylene-ethylene block copolymer, an ethylene-α-olefin copolymer elastomer and an inorganic filler, and since the elastomeric component (total of a propylene-ethylene random copolymer portion in the propylene-ethylene block copolymer, and an ethylene-α-olefin copolymer elastomer) in the resin composition is designed to have high strength, the resin composition shows excellent paint coatability, peeling resistance of paint coatings and resistance to high-temperature, high-pressure washing, in addition to welled balanced mechanical properties such as impact resistance, ductility, tensile elongation, thermal deformation resistance, brittle temperature, and hardness. Also, it suffers from only small molding shrinkage and linear expansion coefficient.

Such resin compositions of the present invention are usable in various applications, and particularly suitable for exterior automotive parts, etc.

What is claimed is:

1. A resin composition having excellent paint coatability comprising;
   (a) 50–80 weight % of a multi-stage polymerized propylene-ethylene block copolymer consisting essentially of (i) a propylene homopolymer portion, (ii) a propylene-ethylene random copolymer portion, and (iii) an ethylene homopolymer portion, said block copolymer having an ethylene content of 2–10 weight %, said propylene-ethylene random copolymer portion having a number-average molecular weight of $20 \times 10^4$ or more and a weight-average molecular weight of $60 \times 10^4$ or more;
   (b) 20–40 weight of an ethylene-α-olefin copolymer elastomer having an ethylene content of 50–90 mol %, and
   (c) 20 weight % or less of an inorganic filler.

2. A resin composition having excellent paint coatability comprising;
   (a) 50–80 weight % of a multi-stage polymerized propylene-ethylene block copolymer consisting essentially of (i) a propylene homopolymer portion, (ii) a propylene-ethylene random copolymer portion, and (iii) an ethylene homopolymer portion, said block copolymer having an ethylene content of 2–15 weight %, an ethylene content of 60 weight % or more based on the total of said portions (ii) and (iii), and said ethylene homopolymer portion (iii) being 40 weight % or more based on the total amount of said portions (ii) and (iii);
   (b) 20–40 weight % of an ethylene-α-olefin copolymer elastomer having an ethylene content of 50–90 mol %, and
   (c) 20 weight % or less of an inorganic filler.

* * * * *